(12) United States Patent
Park et al.

(10) Patent No.: US 10,615,462 B2
(45) Date of Patent: Apr. 7, 2020

(54) LITHIUM-SULFUR BATTERY AND BATTERY MODULE INCLUDING SAME

(71) Applicant: LG CHEM, LTD., Seoul (KR)

(72) Inventors: Intae Park, Daejeon (KR); Changhun Park, Daejeon (KR); Seongeun Park, Daejeon (KR); Yoonsoo Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 86 days.

(21) Appl. No.: 15/509,644

(22) PCT Filed: Sep. 10, 2015

(86) PCT No.: PCT/KR2015/009533
§ 371 (c)(1),
(2) Date: Mar. 8, 2017

(87) PCT Pub. No.: WO2016/047942
PCT Pub. Date: Mar. 31, 2016

(65) Prior Publication Data
US 2017/0301962 A1 Oct. 19, 2017

(30) Foreign Application Priority Data

Sep. 26, 2014 (KR) ........................ 10-2014-0128999

(51) Int. Cl.
*H01M 4/134* (2010.01)
*H01M 4/38* (2006.01)
(Continued)

(52) U.S. Cl.
CPC ......... *H01M 10/4235* (2013.01); *H01M 4/13* (2013.01); *H01M 4/134* (2013.01);
(Continued)

(58) Field of Classification Search
CPC .......... H01M 4/13; H01M 4/134; H01M 4/38; H01M 4/382; H01M 4/58; H01M 10/052;
(Continued)

(56) References Cited

U.S. PATENT DOCUMENTS

2004/0209159 A1   10/2004 Lee et al.
2005/0095504 A1   5/2005 Kim et al.
(Continued)

FOREIGN PATENT DOCUMENTS

CN    1571187 A    1/2005
CN    102185127 A   9/2011
(Continued)

OTHER PUBLICATIONS

Dudney, N.J. et al., "Solid State Thin Film Rechargeable Batteries," Materials Science and Engineering B, Feb. 15, 2005, vol. 116, No. 3, pp. 245-249.*
(Continued)

*Primary Examiner* — Brittany L Raymond
(74) *Attorney, Agent, or Firm* — Birch, Stewart, Kolasch & Birch, LLP (57) ABSTRACT

The present specification relates to a lithium-sulfur battery including an anode, a cathode, and an electrolyte provided between the anode and the cathode, and a battery module including the same.

8 Claims, 10 Drawing Sheets

(51) Int. Cl.
- *H01M 4/58* (2010.01)
- *H01M 10/42* (2006.01)
- *H01M 10/0569* (2010.01)
- *H01M 4/13* (2010.01)
- *H01M 10/052* (2010.01)

(52) U.S. Cl.
CPC ............ *H01M 4/38* (2013.01); *H01M 4/382* (2013.01); *H01M 4/58* (2013.01); *H01M 10/052* (2013.01); *H01M 10/0569* (2013.01); *H01M 2220/20* (2013.01); *H01M 2300/004* (2013.01); *Y02E 60/122* (2013.01); *Y02T 10/7011* (2013.01)

(58) Field of Classification Search
CPC ......... H01M 10/0569; H01M 10/4235; H01M 2220/20; H01M 2300/004; Y02T 10/7011; Y02E 60/122
See application file for complete search history.

(56) References Cited

U.S. PATENT DOCUMENTS

| | | | |
|---|---|---|---|
| 2005/0147891 A1 | 7/2005 | Mikhaylik | |
| 2005/0178659 A1* | 8/2005 | Takahashi | C08G 61/124 204/291 |
| 2005/0244715 A1 | 11/2005 | Cho et al. | |
| 2008/0280197 A1* | 11/2008 | Machida | H01M 4/13 429/129 |
| 2011/0151335 A1 | 6/2011 | Deromelaere et al. | |
| 2012/0315545 A1 | 12/2012 | Son et al. | |
| 2013/0136968 A1 | 5/2013 | Glanz et al. | |
| 2014/0220453 A1 | 8/2014 | Barchasz | |
| 2014/0342205 A1 | 11/2014 | Machida | |
| 2015/0010804 A1* | 1/2015 | Laramie | C25B 11/02 429/144 |
| 2015/0104719 A1* | 4/2015 | Lohmann | H01M 2/022 429/403 |

FOREIGN PATENT DOCUMENTS

| | | | |
|---|---|---|---|
| CN | 103985840 A | | 8/2014 |
| DE | 10 2012 200 862 | * | 7/2013 |
| DE | 10 2012 200 862 A1 | | 7/2013 |
| JP | 2008-277207 A | | 11/2008 |
| JP | 2008-282593 A | | 11/2008 |
| JP | 2013-515336 A | | 5/2013 |
| KR | 10-2005-0041093 A | | 5/2005 |
| KR | 10-0542213 B1 | | 1/2006 |
| KR | 10-0590096 B1 | | 6/2006 |
| KR | 10-2006-0125852 A | | 12/2006 |
| KR | 10-2008-0099163 A | | 11/2008 |
| KR | 10-2012-0135808 A | | 12/2012 |
| KR | 10-2013-0053817 A | | 5/2013 |
| KR | 10-2013-0105362 A | | 9/2013 |
| KR | 10-2014-0039592 A | | 4/2014 |

OTHER PUBLICATIONS

European Office Action for Appl. No. 15843381.3 dated Mar. 1, 2018.
International Search Report for PCT/KR2015/009533 dated Dec. 28, 2015.
Written Opinion of the International Searching Authority for PCT/KR2015/009533 dated Dec. 28, 2015.
European Office Action for Appl. No. 15843381.3 dated Jul. 13, 2018.
Indian Office Action for corresponding Indian Application No. 201717007105, dated Oct. 16, 2019, with English translation.

* cited by examiner

ELECTROLYTE

LITHIUM-SULFUR BATTERY AND BATTERY MODULE INCLUDING SAME

TECHNICAL FIELD

This application claims priority to and the benefits of Korean Patent Application No. 10-2014-0128999, filed with the Korean Intellectual Property Office on Sep. 26, 2014, the entire contents of which are incorporated herein by reference.

The present specification relates to a lithium-sulfur battery including an anode, a cathode and an electrolyte provided between the anode and the cathode, and a battery module including the same.

BACKGROUND ART

Lithium-sulfur batteries are a secondary battery using sulfur-based compounds having sulfur-sulfur bonds as a cathode active material, and using alkali metals such as lithium, or carbon-based materials capable of intercalation and deintercalation of metal ions such as lithium ions as an anode active material. Electric energy is stored and generated using an oxidation-reduction reaction reducing an oxidation number of sulfur as sulfur-sulfur bonds are broken during discharge, a reduction reaction, and forming sulfur-sulfur bonds again as an oxidation number of the sulfur increases during charge, an oxidation reaction.

The lithium-sulfur battery is promising in terms of energy density since energy density is 3830 mAh/g when using lithium metal used as an anode active material, and energy density is 1675 mAh/g when using sulfur ($S_8$) used as a cathode active material. In addition, sulfur-based materials used as a cathode active material have an advantage in that they are low-priced and environmental-friendly.

However, sulfur is close to a nonconductor having electric conductivity of $5 \times 10^{-30}$ S/cm, and has a problem in that transfer of electrons generated from an electrochemical reaction is difficult. Accordingly, an electric conductor such as carbon capable of providing a smooth electrochemical reaction site needs to be used. Herein, when the conductor and the sulfur are simply mixed, the sulfur leaks to an electrolyte during an oxidation-reduction reaction, and then the leaked sulfur deteriorates battery life. When the conductor and the sulfur are simply mixed, and a suitable liquid electrolyte is not selected, elution of lithium polysulfide, a reduced material of sulfur, occurs leading to a problem of making participation in the electrochemical reaction impossible.

Consequently, there have been demands for improving a quality of carbon and sulfur mixture so that elution of sulfur to an electrolyte is reduced, and electric conductivity of an electrode including sulfur increases.

DISCLOSURE

Technical Problem

The present specification is directed to providing a lithium-sulfur battery including an anode, a cathode and an electrolyte provided between the anode and the cathode, and a battery module including the same.

Technical Solution

One embodiment of the present specification provides a lithium-sulfur battery including an anode including an anode current collector and a lithium metal layer provided on the anode current collector; a cathode including a sulfur-containing material; an electrolyte provided between the anode and the cathode; and an insulator film provided so as to cover a boundary line at which the anode current collector and the lithium metal layer adjoin.

Another embodiment of the present specification provides a battery module including the lithium-sulfur battery as a unit battery.

Advantageous Effects

A lithium-sulfur battery according to one embodiment of the present specification is capable of reducing lithium metal corrosion at an anode.

REFERENCE NUMERAL

10: boundary line at which anode current collector and lithium metal layer adjoin
20: surface not adjoining lithium metal layer in surface provided with lithium metal layer of anode current collector
30: side surface of lithium metal layer
40: edge of lithium metal layer
100: insulator film

MODE FOR DISCLOSURE

Hereinafter, the present specification will be described in detail.

The present specification provides a lithium-sulfur battery including an anode including an anode current collector and a lithium metal layer provided on the anode current collector; a cathode including a sulfur-containing material; an electrolyte provided between the anode and the cathode; and an insulator film provided so as to cover a boundary line at which the anode current collector and the lithium metal layer adjoin.

In the present specification, "cover" means being in direct contact with to be provided, and for example, "insulator film provided so as to cover a boundary line at which the anode current collector and the lithium metal layer adjoin" means an insulator film being provided by being in direct contact with a boundary line at which the anode current collector and the lithium metal layer adjoin, and furthermore, means an insulator film sealing the boundary line so that the boundary line at which the anode current collector and the lithium metal layer adjoin is not exposed to a liquid electrolyte.

The anode releases electrons when a battery is discharged causing an oxidation reaction producing metal ions, and may perform a role of a cathode (reduction electrode) when the battery is charged.

The anode may include an anode current collector and a lithium metal layer provided on the anode current collector.

Lithium metal of the lithium metal layer is a metal having standard reduction potential of −3.040 V, and is a metal having a very strong tendency to be oxidized, and when such lithium metal meets heteromaterials having a tendency to oxidize such as oxygen, sulfur or polysulfide, oxidation (corrosion) of the lithium metal rapidly progresses. Herein, when a dissimilar metal that is high potential compared to lithium metal is exposed to oxygen, sulfur or polysulfide while being attached to lithium, a sacrificial anodic reaction in which lithium metal that is relatively low potential compared to a high potential dissimilar metal is sacrificially consumed instead of the high potential metal. Such a sacrificial anodic reaction occurs at a bonding edge between metals being in a relatively low energy state (unstable state) and performing a high reaction site rather than on a lithium metal surface.

Lithium metal of the lithium metal layer provided on the anode current collector including a dissimilar metal that is high potential than lithium metal may cause a sacrificial anodic reaction at an edge bonded with the anode current collector.

The lithium-sulfur battery of the present specification may prevent or reduce lithium metal layer corrosion caused by the sacrificial anodic reaction.

The anode current collector performs current collection of an anode and is not limited as long as it is a material having electric conductivity, and for example, one, two or more selected from the group consisting of carbon, stainless, nickel, aluminum, iron and titanium may be used, and more specifically, a carbon-coated aluminum current collector may be used. Using a carbon-coated aluminum substrate is advantageous in that, when compared to an aluminum substrate that is not carbon-coated, the carbon-coated aluminum substrate has excellent adhesive strength for active materials, has low contact resistance, and may prevent corrosion of aluminum caused by polysulfide. As the forms of the current collector, various forms such as films, sheets, foil, nets, porous bodies, foams and non-woven fabrics may be used.

The lithium metal layer means an anode active material layer including lithium metal elements. Materials of the lithium metal electrode may include lithium alloys, lithium metal, oxides of lithium alloys or lithium oxides. Herein, a part of the lithium metal layer may be deteriorated by oxygen or moisture, or may include impurities.

The lithium metal layer may produce lithium ions while releasing electrons when a battery is discharged.

The insulator film may be provided so as to cover a boundary line at which the anode current collector and the lithium metal layer adjoin. In this case, production of lithium polysulfide on the boundary line at which the anode current collector and the lithium metal layer adjoin caused by the reaction with sulfur present on an electrolyte may be prevented.

Figure 1:
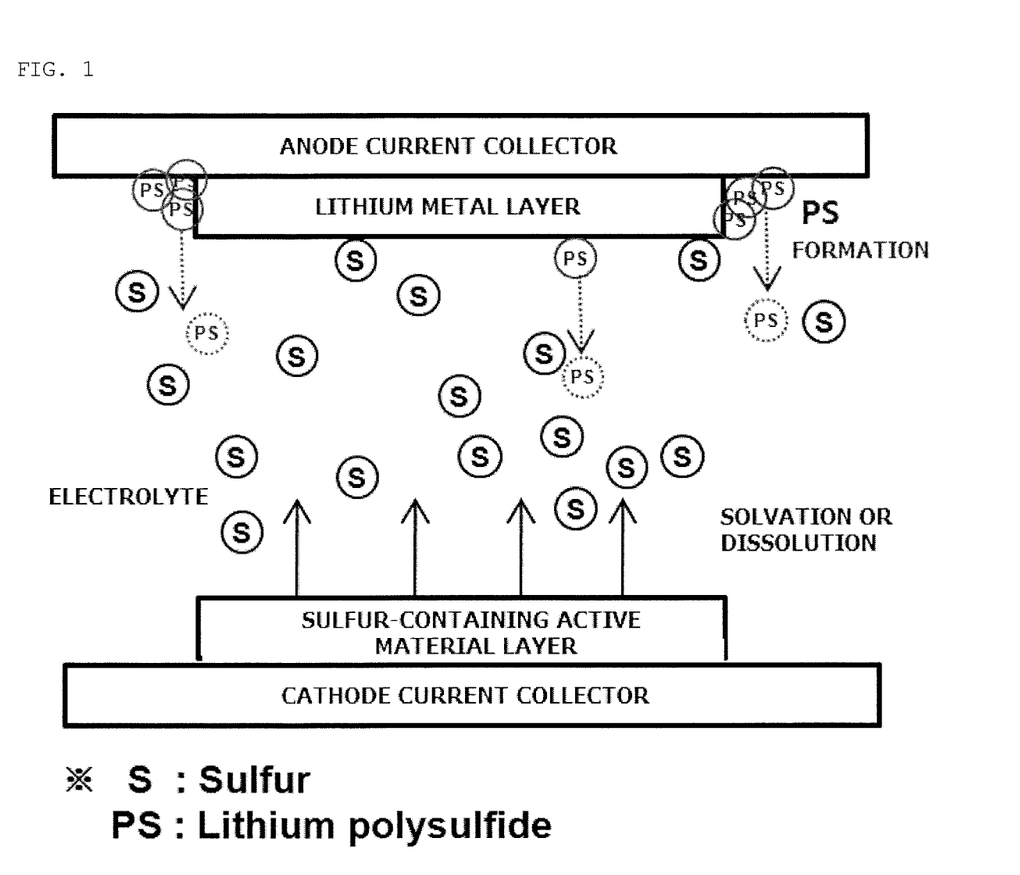
FIG. 1 is a mimetic diagram representing a corrosion behavior of a lithium metal layer with sulfur elution in a lithium-sulfur battery.
Figure 2:
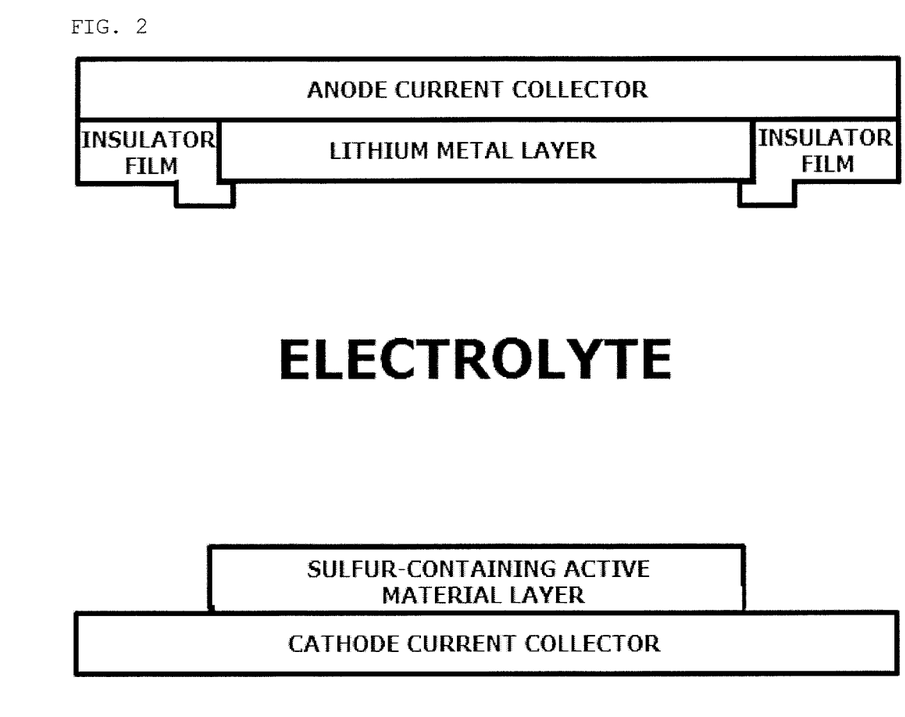
FIG. 2 is a mimetic diagram of a lithium-sulfur battery according to one embodiment of the present specification.
Figure 3:
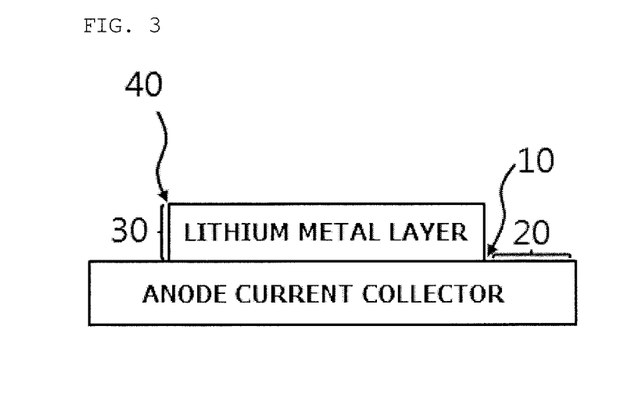
FIG. 3 is a mimetic diagram of an anode of a lithium-sulfur battery according to one embodiment of the present specification.
Figure 18:
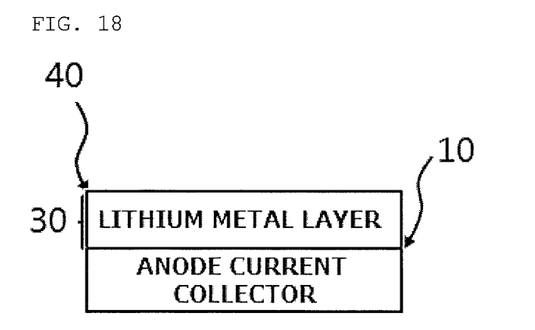
FIG. 18 is a mimetic diagram of an anode of a lithium-sulfur battery according to another embodiment of the present specification.

The boundary line at which the anode current collector and the lithium metal layer adjoin refers to a line formed at the boundary by the lithium metal layer being provided on the anode current collector, and when describing based on FIG. 3 and FIG. 18, the boundary line at which the anode current collector and the lithium metal layer adjoin means drawing symbol "10" in the anode section of FIG. 3 and FIG. 18.

The insulator film is not limited in the provided foam as long as it covers the boundary line at which the anode current collector and the lithium metal layer adjoin, and for example, any one of the insulator film forms illustrated in FIG. 4 to FIG. 11 and FIG. 19 to FIG. 22 may be included.

Figures 4, 5:
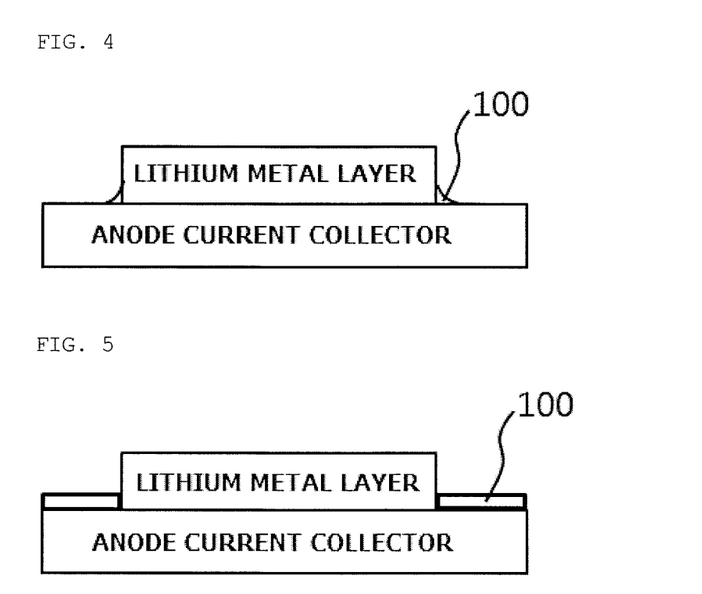
FIG. 4 to FIG. 11 are mimetic diagrams of an insulator film provided in a lithium electrode having a structure of FIG. 3.
Figure 19:
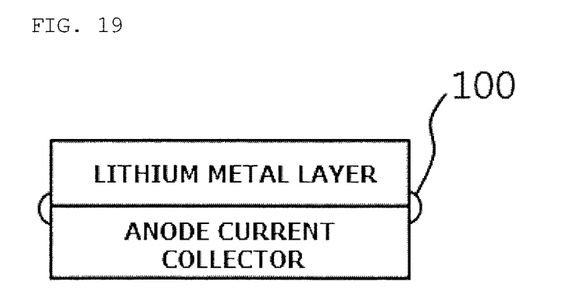
FIG. 19 to FIG. 22 are mimetic diagrams of an insulator film provided in a lithium electrode having a structure of FIG. 18.

When describing based on FIG. 3 and FIG. 4, and FIG. 18 and FIG. 19, the insulator film (100) may only cover the boundary line (10) at which the anode current collector and the lithium metal layer adjoin. Specifically, as illustrated in FIG. 4, the insulator film may both cover a part of the top surface of the current collector and a part of the side surface of the lithium metal layer, or as illustrated in FIG. 19, may both cover a side surface of the lithium metal layer and a side surface of the current collector adjacent to the boundary line.

The insulator film may be provided so as to cover the boundary line at which the anode current collector and the lithium metal layer adjoin, and a surface that does not adjoin the lithium metal layer in a surface provided with the lithium metal layer of the anode current collector. In this case, the anode current collector is separated so as not to adjoin an electrolyte in which sulfur may present, and there is an advantage in that accelerating the production of lithium polysulfide caused by the reaction of lithium and sulfur by the anode current collector is prevented. As a result, damages on the sulfur-containing active materials may be reduced, and corrosion of the lithium metal layer may be reduced.

The insulator film is not limited in the provided form as long as it covers the boundary line at which the anode current collector and the lithium metal layer adjoin, and covers a surface that does not adjoin the lithium metal layer in a surface provided with the lithium metal layer of the anode current collector, and for example, any one of the insulator film forms illustrated in FIG. 5 to FIG. 11 may be included.

When describing based on FIG. 3 and FIG. 5, the insulator film (100) may only cover the boundary line (10) at which the anode current collector and the lithium metal layer adjoin, and a surface (20) that does not adjoin the lithium metal layer in a surface provided with the lithium metal layer of the anode current collector.

The insulator film may be additionally provided on a side surface of the lithium metal layer. Specifically, the insulator film may be provided on the boundary line at which the anode current collector and the lithium metal layer adjoin, on a surface that does not adjoin the lithium metal layer in a surface provided with the lithium metal layer of the anode current collector, and on a side surface of the lithium metal layer. When the insulator film is additionally provided on a side surface of the lithium metal layer, rapid corrosion reactions are suppressed by separating side surfaces of the lithium metal layer and the anode current collector from a liquid electrolyte, and reactions on side surfaces having a lower energy compared to the top surface of the lithium metal layer are suppressed, and as a result, uniform electrochemical reactions may be induced on the lithium metal layer.

The insulator film is not limited in the provided form as long as it covers the boundary line at which the anode current collector and the lithium metal layer adjoin, covers a surface that does not adjoin the lithium metal layer in a surface provided with the lithium metal layer of the anode current collector, and covers a side surface of the lithium metal layer, and for example, any one of the insulator film forms illustrated in FIG. 6 to FIG. 11 and FIG. 20 to FIG. 22 may be included.

Figure 6:
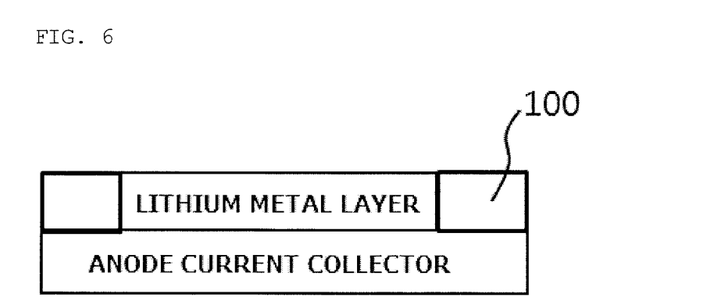
Figure 7:
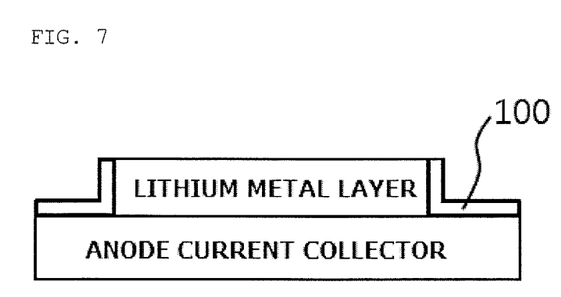

When describing based on FIG. 3, FIG. 6 and FIG. 7, the insulator film (100) may only cover the boundary line (10) at which the anode current collector and the lithium metal layer adjoin, a surface (20) that does not adjoin the lithium metal layer in a surface provided with the lithium metal layer of the anode current collector, and a side surface (30) of the lithium metal layer. Specifically, the thicknesses of the insulator film from each surface may not be constant as in FIG. 6, or the thicknesses of the insulator film from each surface may be similar or identical as in FIG. 7.

Figure 20:
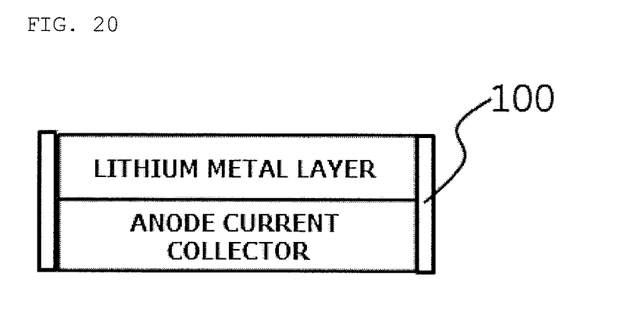

When describing based on FIG. 18 and FIG. 20, the insulator film (100) may only cover the boundary line (10) at which the anode current collector and the lithium metal layer adjoin, a side surface of the anode current collector, and a side surface (30) of the lithium metal layer.

The insulator film may be additionally provided so as to cover an edge of the lithium metal layer. Specifically, the insulator film may be provided so as to cover the boundary line at which the anode current collector and the lithium metal layer adjoin, a surface that does not adjoin the lithium metal layer in a surface provided with the lithium metal layer of the anode current collector, a side surface of the lithium metal layer, and an edge of the lithium metal layer. This has advantages in that it may induce uniform reactions of the lithium metal layer by suppressing rapid corrosion reaction of the lithium metal layer, and a process of coating the insulator film provided so as to cover the boundary line at which the anode current collector and the lithium metal layer adjoin may be readily carried out.

The insulator film is not limited in the provided form as long as it covers the boundary line at which the anode current collector and the lithium metal layer adjoin, a surface that does not adjoin the lithium metal layer in a surface provided with the lithium metal layer of the anode current collector, a side surface of the lithium metal layer, and an edge of the lithium metal layer, and for example, any one of the insulator film forms illustrated in FIG. 8 to FIG. 11 and FIG. 21 and FIG. 22 may be included.

Figure 8:
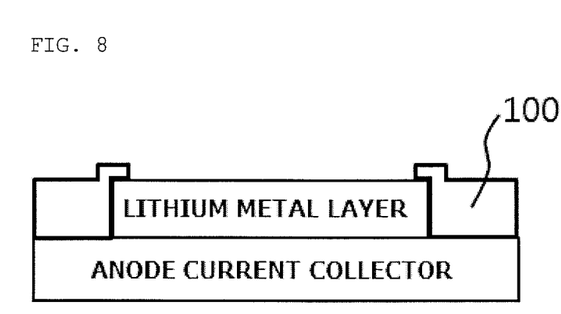
Figure 9:
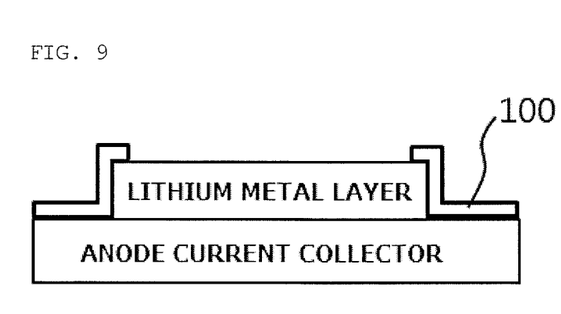

When describing based on FIG. 8 and FIG. 9, the insulator film (100) may only cover the boundary line (10) at which the anode current collector and the lithium metal layer adjoin, a surface (20) that does not adjoin the lithium metal layer in a surface provided with the lithium metal layer of the anode current collector, a side surface (30) of the lithium metal layer, and an edge (40) of the lithium metal layer. Specifically, the thicknesses of the insulator film from each surface may not be constant as in FIG. 8, or the thicknesses of the insulator film from each surface may be similar or identical as in FIG. 9.

Figure 10:
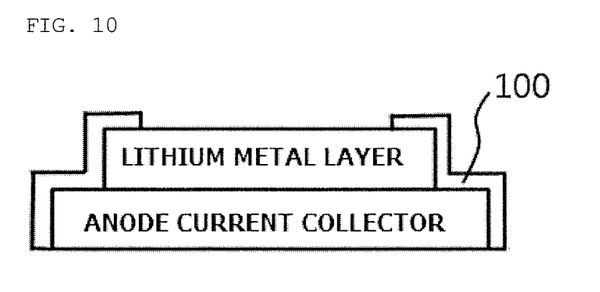

When describing based on FIG. 10, the insulator film (100) may only cover the boundary line (10) at which the anode current collector and the lithium metal layer adjoin, a surface (20) that does not adjoin the lithium metal layer in a surface provided with the lithium metal layer of the anode current collector, a side surface (30) of the lithium metal layer, an edge (40) of the lithium metal layer, and a side surface of the anode current collector.

Figure 11:
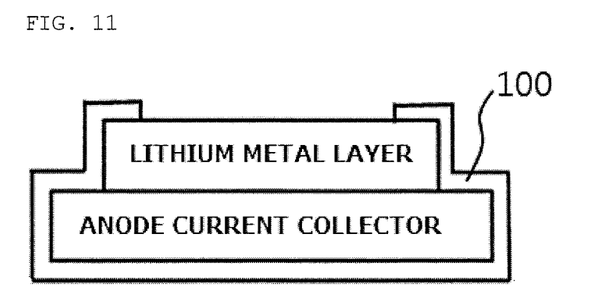

When describing based on FIG. 11, the insulator film (100) may only cover the boundary line (10) at which the anode current collector and the lithium metal layer adjoin, a surface (20) that does not adjoin the lithium metal layer in a surface provided with the lithium metal layer of the anode current collector, a side surface (30) of the lithium metal layer, an edge (40) of the lithium metal layer, a side surface of the anode current collector, and a surface opposite to a surface provided with lithium metal layer in the anode current collector.

Figure 21:
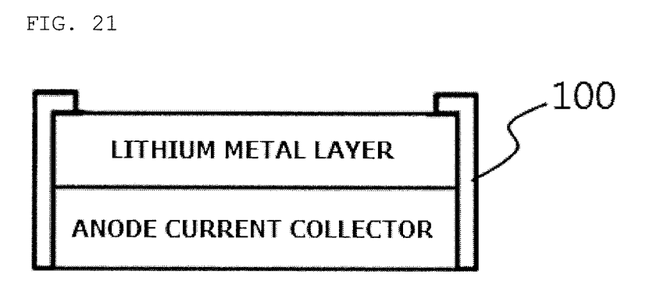

When describing based on FIG. 21, the insulator film (100) may only cover the boundary line (10) at which the anode current collector and the lithium metal layer adjoin, a side surface (30) of the lithium metal layer, an edge (40) of the lithium metal layer, and a side surface of the anode current collector.

Figure 22:
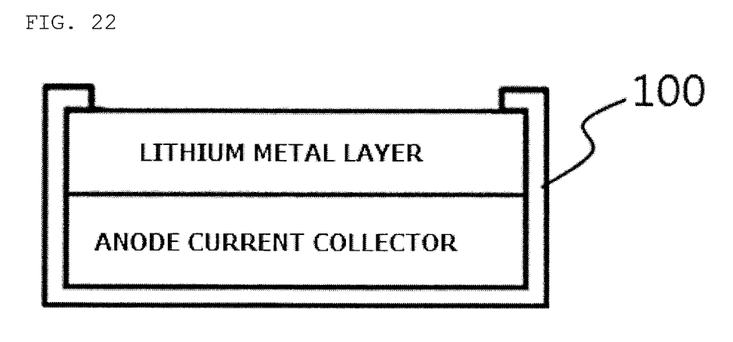

When describing based on FIG. 22, the insulator film (100) may only cover the boundary line (10) at which the anode current collector and the lithium metal layer adjoin, a side surface (30) of the lithium metal layer, an edge (40) of the lithium metal layer, a side surface of the anode current collector, and a surface opposite to a surface provided with lithium metal layer in the anode current collector.

In order to suppress side reactions or self-discharge, a chemical layer may be formed on a lithium metal surface using liquid electrolyte components. When a chemical layer is formed by adding an additive (for example, $LiNO_3$) into a liquid electrolyte as above, viscosity of the liquid electrolyte increases due to the addition of an additive, and ion conductivity of the liquid electrolyte may decrease.

Through the results of Test Example 3 impregnating an anode without an insulator film of Comparative Example 1 to a liquid electrolyte in which $LiNO_3$ is added as an additive, it is seen that polylithium sulfide is formed at a boundary between the lithium metal layer and the anode current collector without an insulator film.

Accordingly, it is seen that the chemical layer for suppressing side reactions or self-discharge is not able to prevent the formation of polylithium sulfide at a boundary of the current collector and the lithium metal layer.

That fact that a battery using the anode of the present specification is capable of preventing the formation of polylithium sulfide at a boundary of the current collector and the lithium metal layer may be identified in Test Example 1.

In the liquid electrolyte of the battery of the present specification, an additive forming a chemical layer may not be added, or the content of an additive may be reduced, and therefore, an increase in the viscosity of the liquid electrolyte or a decrease in the ion conductivity of the liquid electrolyte caused by the addition of an additive may be reduced.

Figure 17:
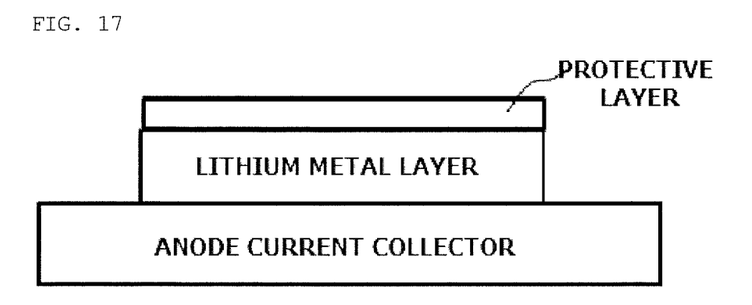
FIG. 17 is a structural diagram of an anode in which a polymer protective layer is formed.

A polymer protective layer for suppressing a growth of lithium metal on a resin is formed on a lithium metal surface as in FIG. 17. The protective layer is formed at a place different from the anode of the present specification forming an insulator film covering a boundary (edge) between the lithium metal and the anode current collector, and lithium polysulfide formation may not be suppressed through the protective layer.

As seen from Test Examples 3 and 4 of the present specification, lithium polysulfide is mostly formed at an interface of the current collector and the lithium metal layer, and therefore, lithium polysulfide formation may not be suppressed through the protective layer.

The insulator film may have a thickness of greater than or equal to 1 nm and less than or equal to 500 µm. Herein, the insulator film thickness means the shortest distance from a surface on which the insulator film is provided to the top of the insulator film, and when there are two or more provided surfaces, the thicknesses from each surface may be the same as or different from each other.

When the thicknesses of the insulator film are the same, the thicknesses of the insulator film may be greater than or equal to 1 nm and less than or equal to 500 µm, and specifically, greater than or equal to 100 nm and less than or equal to 5 µm.

When the thicknesses from each of the two or more surfaces on which the insulator film is provided are different, the thicknesses of the insulator film may be greater than or equal to 1 nm and less than or equal to 500 µm, and specifically, greater than or equal to 50 nm and less than or equal to 10 µm.

In a laminate of the anode current collector and the lithium metal layer provided on the anode current collector, at least 0.1% or more of the laminate surface, that is, at least 0.1% or more of the whole surface area except for an interface at which the anode current collector and the lithium metal layer are brought into contact with each other may be covered with the insulator film, as shown in FIG. 3 and FIG. 18. Herein, the insulator film covers the whole boundary line at which the anode current collector and the lithium metal layer adjoin, and at least 10% or more of the whole surface area of the lithium metal layer except for an interface at which the anode current collector and the lithium metal layer are brought into contact with each other is not to be covered with the insulator film.

In the laminate, at least 0.1% or greater and 90% or less of the laminate surface, that is, at least 0.1% or greater and 90% or less of the surface area except for an interface at which the anode current collector and the lithium metal layer are brought into contact with each other may be covered with the insulator film. Herein, the insulator film covers the whole boundary line at which the anode current collector and the lithium metal layer adjoin, and at least 10% or more of the whole surface area of the lithium metal layer except for an interface at which the anode current collector and the lithium metal layer are brought into contact with each other is not to be covered with the insulator film.

The insulator film may have insulation resistance of $10^6$ Ω·m (deionized water) or greater. When the insulation resistance is less than $10^6$ Ω·m, (when electric conductivity increases), lithium metal may be precipitated in the insulator film due to lithium ion reduction as charge and discharge are repeated.

Materials of the insulator film are not particularly limited as long as the prepared insulator film has insulation resistance of $10^6$ Ω·m (deionized water) or greater, and examples thereof may include at least one of ceramic-based insulating materials and insulating polymers.

The ceramic-based insulating material may include at least one of ceramic oxide-based insulating materials and ceramic nitride-based insulating materials, but is not limited thereto.

The ceramic oxide-based insulating material may include at least one of aluminum oxide, antimony trioxide, antimony tetroxide, antimony pentoxide, arsenic trioxide, arsenic pentoxide, barium oxide, bismuth(III) oxide, bismuth(V) oxide, calcium oxide, chromium(II) oxide, chromium(III) oxide, chromium(IV) oxide, chromium(VI) oxide, cobalt(II) oxide, cobalt(II,III) oxide, cobalt(III) oxide, copper(I) oxide, copper(II) oxide, iron(II) oxide, black, iron(II,III) oxide, iron (III) oxide, lead(II) oxide, lead(II,IV) oxide, lead(IV) oxide, lithium oxide, magnesium oxide, manganese(II) oxide, manganese(III) oxide, manganese(IV) oxide, manganese(VII) oxide, mercury(II) oxide, nickel(II) oxide, nickel(III) oxide, rubidium oxide, silicon dioxide, silver(I) oxide, thallium(I) oxide, thallium(III) oxide, tin(II) oxide, tin(IV) oxide and zinc oxide.

The ceramic nitride-based insulating material may include at least one of aluminum gallium nitride, aluminum nitride, aluminum oxynitride, beryllium nitride, beta carbon nitride, boron nitride, calcium nitride, chromium nitride, gallium nitride, germanium nitride, graphitic carbon nitride, indium gallium aluminum nitride, indium gallium nitride, indium nitride, iron nitride, lithium nitride, magnesium nitride, niobium nitride, phosphoryl nitride, silicon nitride, silicon oxynitride, silver azide, silver nitride, sodium nitride, strontium nitride, tantalum nitride, tetrasulfur tetranitride, titanium aluminum nitride, titanium nitride, tungsten nitride, uranium nitride, vanadium nitride, yttrium nitride, zinc nitride and zirconium nitride.

The insulating polymer may include at least one of epoxy, nitrile (rubber), enol-formaldehyde, polyacrylonitrile, polyamide (Nylon 66), polybutadiene, polybutylene terephthalate polycarbonate (PC), polyester, polyetheretherketone (PEEK), polyethylene (PE), polyethylene terephthalate (PET), polyimide, polymethyl methacrylate (PMMA), polymethylpentene (TPX), polypropylene (PP), polysulfone (PSF), polystyrene (PS), polytetrafluoroethylene (PTFE), polyvinyl acetate, polyvinylidene fluoride (PVDF), polyvinyl chloride (PVC), silicone (rubber) and styrene butadiene (rubber).

The cathode receives cations transferred from an anode when a battery is discharged causing a reduction reaction, and may perform a role of an anode (oxidation electrode) when the battery is charged.

The cathode may include a sulfur-containing material as a cathode active material, and in this case, lithium cations transferred from the anode react with sulfur of the cathode to produce a sulfur-lithium metal composite, and a reduction reaction of the cathode may occur.

As the oxidation-reduction reaction is repeated in the cathode, sulfur or lithium polysulfide may be eluted to an electrolyte, and the sulfur or the lithium polysulfide eluted to the electrolyte may move to the anode.

The cathode may include a cathode current collector and a sulfur-containing active material layer provided on the cathode current collector.

The cathode may include a cathode current collector. The cathode current collector performs current collection of a cathode and is not limited as long as it is a material having electric conductivity, and for example, one, two or more selected from the group consisting of carbon, stainless, nickel, aluminum, iron and titanium may be used, and more specifically, a carbon-coated aluminum current collector may be used. Using a carbon-coated aluminum substrate is advantageous in that, when compared to an aluminum substrate that is not carbon-coated, the carbon-coated aluminum substrate has excellent adhesive strength for active materials, has low contact resistance, and may prevent corrosion of aluminum caused by polysulfide. As the forms of the current collector, various forms such as films, sheets, foil, nets, porous bodies, foams and non-woven fabrics may be used.

The sulfur-containing active material layer means a layer including a sulfur-containing compound having sulfur-sulfur bonds, and electric energy may be stored and generated using an oxidation-reduction reaction having a reduction reaction reducing an oxidation number of sulfur as sulfur-sulfur bonds are broken during discharge, and having an oxidation reaction forming sulfur-sulfur bonds again as an oxidation number of the sulfur increases during charge.

The sulfur-containing compound having sulfur-sulfur bonds may use materials known in the art and is not particularly limited. Examples of the sulfur-containing compound having sulfur-sulfur bonds may include sulfur element ($S_8$) or sulfur compounds having sulfur-sulfur bonds.

The sulfur compound having sulfur-sulfur bonds may include at least one of metal sulfide compounds such as CuS, $CuS_2$, FeS and $FeS_2$; sulfur-carbon composites; and sulfur-containing polymers.

The sulfur is close to a nonconductor itself, and in order to be used as the cathode active material, the cathode active material is preferably prepared with materials capable of providing conductivity to sulfur using methods such as wrapping, coating and impregnation. For example, sulfur-carbon composites may be used as the cathode active material.

The sulfur-containing active material layer may further include a conductor. The conductor is not particularly limited as long as it has conductivity without inducing chemical changes in a battery, and graphite-based materials such as KS6; carbon black such as Super-P, denka black, acetylene black, Ketjen black, channel black, furnace black, lamp black, thermal black and carbon black; carbon derivatives such as fullerene; carbon nanotubes; conductive fibers such as carbon fiber or metal fiber; metal powder such as fluorinated carbon, aluminum and nickel powder; or conductive polymers such as polyaniline, polythiophene, polyacetylene and polypyrrole may be used either alone or as a mixture thereof.

The sulfur-containing active material layer may further include an amphiphilic material. The amphiphilic material traps polysulfide produced in a cathode active material such as sulfur-carbon composites, and prevents the polysulfide moving to a liquid electrolyte and an anode. The amphiphilic material may include materials having affinity for both polar solvents and non-polar solvents, and specific examples thereof may include one or more types of polyvinylpyrrolidone (PVP), polyethylene oxide, gelatin and the like, but are not limited thereto.

The electrolyte may be provided between an anode and a cathode, and specifically, may be provided only between an anode and a cathode so as to minimize a contact with current collectors of the anode and the cathode. This may reduce or block corrosion caused by sulfur or lithium polysulfide that may be eluted to the electrolyte.

The electrolyte may include a lithium salt and an organic solvent.

The concentration of the lithium salt may be from 0.2 M to 2 M, specifically from 0.6 M to 2 M and more specifically from 0.7 M to 1.7 M depending on various factors such as precise compositions of a electrolyte solvent mixture, solubility of the salt, conductivity of the dissolved salt, charge and discharge conditions of a battery, working temperatures and other factors known in the field of lithium batteries. This has an advantage in that electrolyte performance is maintained due to proper electrolyte conductivity, and interruption of lithium ion migration caused by the viscosity of the electrolyte does not occur. Examples of the lithium salt to be used in the present application may include one or more from the group consisting of LiSCN, LiBr, LiI, $LiPF_6$, $LiBF_4$, $LiSO_3CF_3$, $LiClO_4$, $LiSO_3CH_3$, $LiB(Ph)_4$, $LiC(SO_2CF_3)_3$ and $LiN(SO_2CF_3)_2$.

The organic solvent may use a single solvent, or may be a mixed organic solvent of two or more. When using a mixed organic solvent of two or more, using one or more solvents selected from two or more groups of a weak polar solvent group, a strong polar solvent group and a lithium metal protecting solvent group is preferred.

The weak polar solvent is defined as a solvent having dielectric constant of smaller than 15 capable of dissolving sulfur elements among aryl compounds, bicyclic ether and bicyclic carbonate, the strong polar solvent is defined as a solvent having dielectric constant of larger than 15 capable of dissolving lithium polysulfide among bicyclic carbonate, sulfoxide compounds, lactone compounds, ketone compounds, ester compounds, sulfate compounds and sulfite compounds, and the lithium metal protecting solvent is defined as a solvent having 50% or higher charge and discharge cycle efficiency forming a solid electrolyte interface (SEI) stable for lithium metal such as saturated ether compounds, unsaturated ether compounds, and heterocyclic compounds including N, O, S or combinations thereof.

Specific examples of the weak polar solvent may include xylene, dimethoxyethane, 2-methyltetrahydrofuran, diethyl carbonate, dimethyl carbonate, toluene, dimethyl ether, diethyl ether, diglyme, tetraglyme or the like.

Specific examples of the strong polar solvent may include hexamethyl phosphoric triamide, γ-butyrolactone, acetonitrile, ethylene carbonate, propylene carbonate, N-methylpyrrolidone, 3-methyl-2-oxazolidone, dimethylformamide, sulfolane, dimethyl acetamide, dimethyl sulfoxide, dimethyl sulfate, ethylene glycol diacetate, dimethyl sulfite, ethylene glycol sulfite or the like.

Specific examples of the lithium protecting solvent may include tetrahydrofuran, ethylene oxide, dioxolane, 3,5-dimethylisoxazole, furan, 2-methylfuran, 1,4-oxane or 4-methyl dioxolane and the like.

The lithium-sulfur battery may further include a separator provided between the cathode and the anode.

The separator separates or insulates the cathode and the anode, and enables lithium ion transfer between the cathode and the anode, and may be formed with porous nonconductive or insulating materials. Such a separator may be an independent member such as a film, or a coating layer added to the cathode and/or the anode.

Examples of materials forming the separator include polyolefin such as polyethylene and polypropylene, glass fiber filter papers and ceramic materials, but are not limited thereto, and the thickness may be approximately from 5 μm to 50 μm, and in detail, approximately from 5 μm to 25 μm.

The present specification provides a battery module including the lithium-sulfur battery as a unit battery.

The battery module may be formed by stacking with bipolar plates provided between two or more of the lithium-sulfur batteries according to one embodiment of the present specification.

Specifically, the battery module may be used as a power supply of electric vehicles, hybrid electric vehicles, plug-in hybrid electric vehicles or power storage systems.

Hereinafter, the present specification will be described in more detail with reference to examples. However, the following examples are for illustrative purposes only, and not for limiting the present specification.

EXAMPLE

Example 1

After forming a lithium metal layer on a 316 stainless steel current collector, a composition for an insulator film including high density polyethylene (HDPE) was prepared, and the insulator film was formed on the lithium metal layer in a form of FIG. 11 to prepare an anode.

Comparative Example 1

After forming a lithium metal layer on a 316 stainless steel current collector, an anode without forming an insulator film was prepared.

Test Example 1

Impregnation Test

Figure 16:
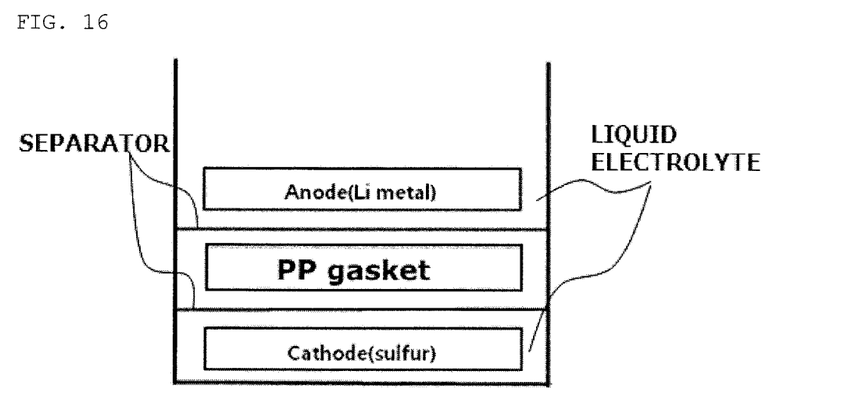
FIG. 16 is a structural diagram of a lithium-sulfur battery of Example 1.

As shown in FIG. 16, a lithium-sulfur battery was formed using the anode of Example 1 or Comparative Example 1 with a sulfur cathode, polypropylene (PP) gasket and a polyethylene separator. A liquid electrolyte (TEGDME:DOL:DME 1:1:1, v/v, 1.0 M LiTFSI, 0.1 M LiNO$_3$) was injected thereto to perform an impregnation test. (TEGDME:DOL:DME=tetraethylene glycol dimethyl ether:dioxolane:dimethoxyethane)

Figure 23:
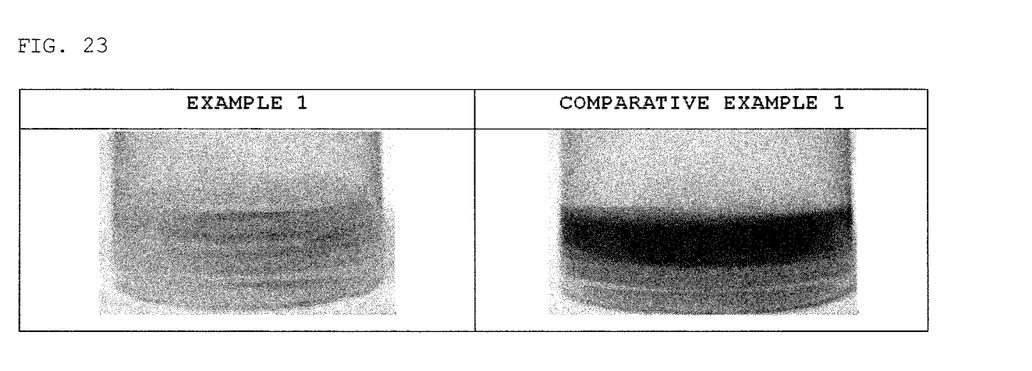
FIG. 23 represents results of Test Example 1.

After 10 days from the injection of the liquid electrolyte to the lithium-sulfur battery, each of the batteries exhibited changes as in the following FIG. 23.

With Example 1, a small amount of lithium polysulfide (Li$_2$S$_8$) was formed, and the formed lithium polysulfide was rapidly reduced to Li$_2$S$_4$ with the color looking look yellow.

With Comparative Example 1, a large amount of lithium polysulfide (Li$_2$S$_8$) was formed with the color looking dark red.

Through the above-mentioned results, it was identified that the anode prepared in Example 1 was effective in suppressing the formation of lithium polysulfide compared to the anode prepared in Comparative Example 1.

Li$_2$S$_8$: Red
Li$_2$S$_4$: Yellow
Li$_2$S$_4$+Li$_2$S$_3$: Green
Li$_2$S$_3$: Blue

Test Example 2

Figure 24:
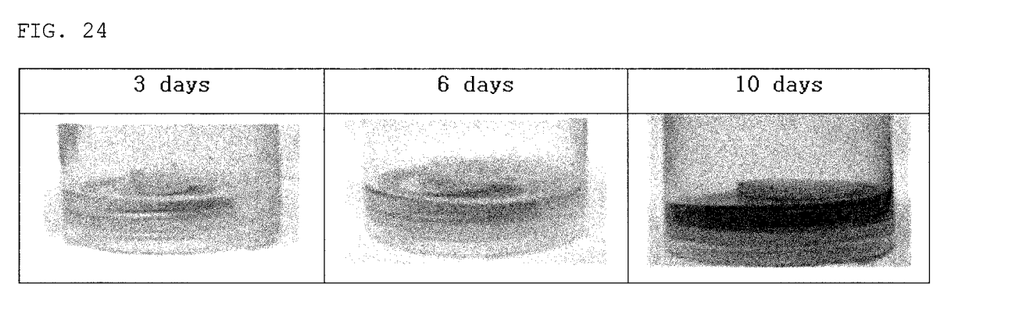
FIG. 24 represents results of Test Example 2.

Color changes in the liquid electrolyte of the lithium-sulfur battery using the anode of Comparative Example 1 in Test Example 1 were observed depending on the time of impregnation, and the results are shown in FIG. 24.

At an early stage of the impregnation (3 days), a small amount of lithium polysulfide (Li$_2$S$_8$) was formed, and the formed lithium polysulfide was rapidly reduced to Li$_2$S$_4$ with the color looking yellow.

At a middle stage of the impregnation (3 days), the concentration of lithium polysulfide of Li$_2$S$_4$ increased, and the color looked dark yellow.

At a late stage of the impregnation (10 days), a reaction of additional lithium polysulfide formation was accelerated as the concentration of lithium polysulfide increased, and as a result, a large amount of lithium polysulfide in the foam of Li$_2$S$_8$ was formed with the color looking dark red.

Test Example 3

Spontaneous Lithium Polysulfide Formation Test 1 (Li—S Chalet Battery)

Figure 12:
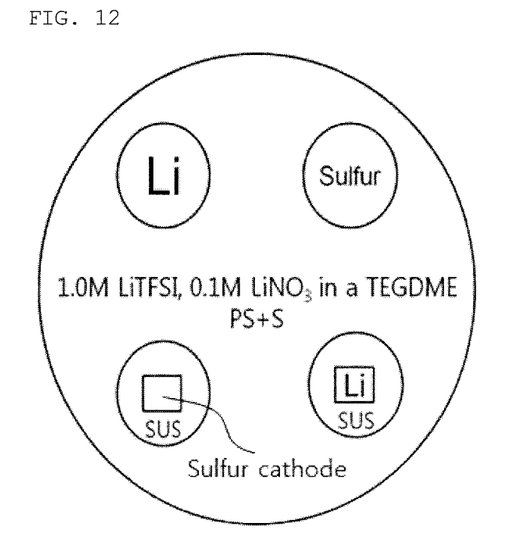
FIG. 12 is a structural diagram of a lithium-sulfur battery manufactured in Test Example 1.

A lithium-sulfur battery without a separator was manufactured by forming a chalet battery as in the picture of FIG. 12 on the floor of a chalet using the anode of Comparative Example 1, and by injecting a liquid electrolyte (TEGDME:DOL:DME (1:1:1, v/v), 1 M LiTFSI, 0.1 M LiNO$_3$) thereto. (TEGDME:DOL:DME=tetraethylene glycol dimethyl ether:dioxolane:dimethoxy ethane)

Figure 13:
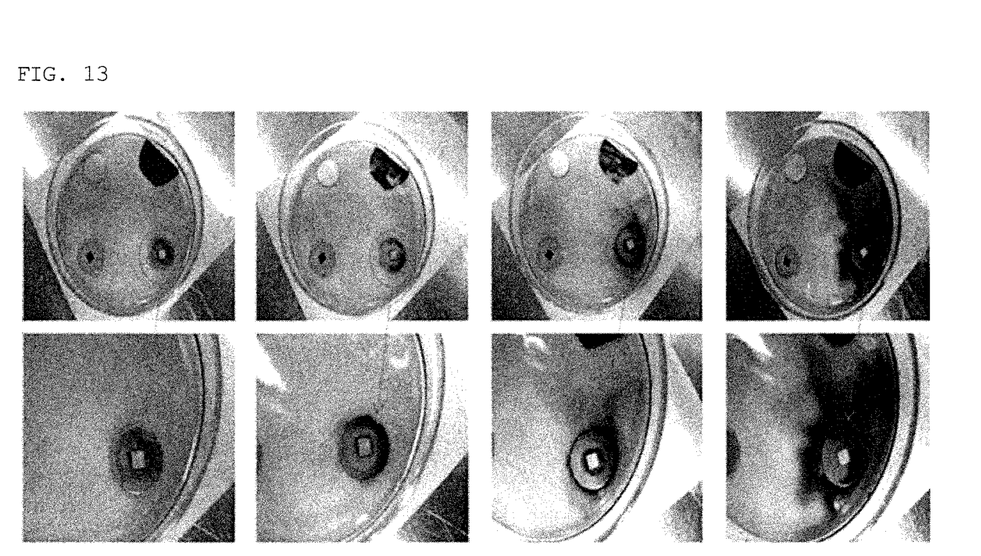
FIG. 13 is a picture of a lithium-sulfur battery after driving a lithium-sulfur battery of Test Example 1.

When driving a battery, it was seen that, as shown in FIG. 13, the case with lithium metal only experienced no changes, however, in the anode of Comparative Example 1 forming lithium metal on the anode current collector, lithium polysulfide was actively formed at a boundary between the anode current collector and the lithium metal layer.

Specifically, it was identified through FIG. 13 that lithium polysulfide was not actively formed in just the lithium metal, and the reaction of lithium polysulfide formation was actively progressed at a boundary between the anode current collector and the lithium metal layer.

In addition, the liquid electrolyte used in the test includes a LiNO$_3$ additive capable of forming a chemical protective layer on the surface through a reaction with lithium metal, however, even when including the additive, it was seen that lithium polysulfide was actively formed at a boundary between the anode current collector and the lithium metal layer.

Through the above-mentioned results, it can be seen that formation of lithium polysulfide at a boundary between the anode current collector and the lithium metal layer may not be prevented even when an additive capable of forming a chemical protective layer on the surface through a reaction with lithium metal is added to the liquid electrolyte, and the boundary between the anode current collector and the lithium metal layer needs to be separated from the liquid electrolyte.

Test Example 4

Spontaneous Lithium Polysulfide Formation Test 2 (Li—S Chalet Battery)

Figure 14:
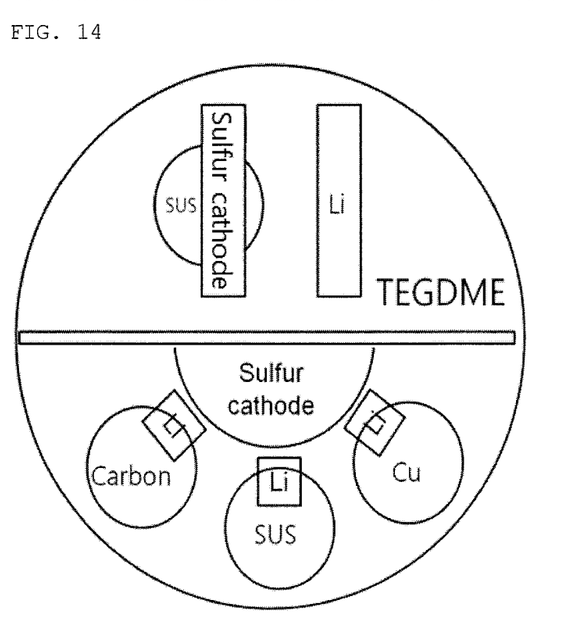
FIG. 14 is a structural diagram of a lithium-sulfur battery manufactured in Test Example 3.

A lithium-sulfur battery without a separator was manufactured by forming a chalet battery as in the picture of FIG. 14 on the floor of a chalet using the anode of Comparative Example 1, and by injecting a liquid electrolyte (TEGDME; tetraethylene glycol dimethyl ether) thereto. Color changes (Li$_2$S$_6$: red, Li$_2$S$_4$: yellow) in the clear liquid electrolyte were observed to observe generation of lithium polysulfide and generation sites thereof.

Figure 15:
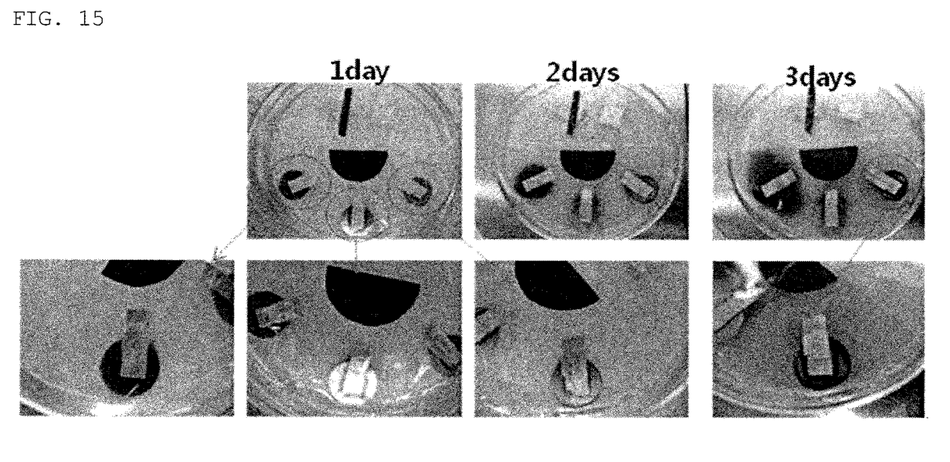
FIG. 15 is a picture of a lithium-sulfur battery after driving a lithium-sulfur battery of Test Example 3.

As a result, it was identified that, as in FIG. 15, the color of the liquid electrolyte turned red at a boundary (edge) between the anode current collector and the lithium metal regardless of the type of the anode current collector. In other words, it was identified that lithium polysulfide was actively produced at a boundary (edge) regardless of the type of the anode current collector, and this is considered as a spontaneous reaction progressed regardless of lithium salt addition.

The invention claimed is:

1. A lithium-sulfur battery comprising:
an anode including an anode current collector and a lithium metal layer provided on the anode current collector, the anode current collector having a first surface and a second surface opposite the first surface, the lithium metal layer having a first surface in direct contact with the first surface of the anode current collector and a second surface opposite the first surface;
a cathode including a sulfur-containing material;
an electrolyte provided between the anode and the cathode; and
an insulator film provided so as to cover a boundary line at which the anode current collector and the lithium metal layer adjoin, the insulator film being spaced from the cathode,
wherein the entire second surface of the lithium metal layer is not covered by the insulator film.

2. The lithium-sulfur battery of claim 1, wherein the insulator film is provided on the boundary line at which the anode current collector and the lithium metal layer adjoin, and on the first surface of the anode current collector.

3. The lithium-sulfur battery of claim 1, wherein the insulator film is provided so as to cover the boundary line at which the anode current collector and the lithium metal layer adjoin, the first surface of the anode current collector, and a side surface of the lithium metal layer.

4. A lithium-sulfur battery comprising:
an anode including an anode current collector and a lithium metal layer provided on the anode current collector, the anode current collector having a first surface and a second surface opposite the first surface, the lithium metal layer having a first surface in direct contact with the first surface of the anode current collector and a second surface opposite the first surface;
a cathode including a sulfur-containing material;
an electrolyte provided between the anode and the cathode; and
an insulator film provided so as to cover a boundary line at which the anode current collector and the lithium metal layer adjoin,
wherein at least a portion of the second surface of the lithium metal layer is not covered by the insulator film, and
wherein the insulator film is provided so as to cover the boundary line at which the anode current collector and the lithium metal layer adjoin, the first surface of the anode current collector, the entire second surface of the anode current collector, and a side surface of the lithium metal layer.

5. The lithium-sulfur battery of claim 1, wherein the insulator film has a thickness of greater than or equal to 1 nm and less than or equal to 500 μm.

6. The lithium-sulfur battery of claim 1, wherein the insulator film includes at least one of ceramic oxide-based insulating materials and ceramic nitride-based insulating materials.

7. The lithium-sulfur battery of claim 1, wherein the insulator film has insulation resistance of $10^6$ Ω·m (deionized water) or more.

8. A battery module including the lithium-sulfur battery of claim 1 as a unit battery.

* * * * *